(12) United States Patent  
Miyata et al.

(10) Patent No.: US 7,413,792 B2
(45) Date of Patent: *Aug. 19, 2008

(54) STRUCTURE WITH ORIENTED TUBULAR PORES

(75) Inventors: Hirokatsu Miyata, Kanagawa (JP); Kazuyuki Kuroda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/958,245

(22) Filed: Oct. 6, 2004

(65) Prior Publication Data

US 2005/0048264 A1    Mar. 3, 2005

Related U.S. Application Data

(62) Division of application No. 09/478,884, filed on Jan. 7, 2000, now Pat. No. 6,846,546.

(30) Foreign Application Priority Data

Jan. 7, 1999   (JP)   ............................... 11-001860
Jun. 18, 1999  (JP)   ............................... 11-172677

(51) Int. Cl.
*B32B 3/20*   (2006.01)
*B01J 21/14*  (2006.01)

(52) U.S. Cl. .................. 428/188; 428/178; 428/304.4; 428/313.9; 423/335; 502/63; 502/232; 502/407

(58) Field of Classification Search .................. 428/188, 428/304.4, 314.2, 315.9, 312.6, 313.9, 178; 423/335; 502/232, 407, 63
See application file for complete search history.

(56) References Cited

U.S. PATENT DOCUMENTS

| 4,666,755 | A  | * | 5/1987  | Shigeta et al. ............... 428/188 |
| 4,689,255 | A  | * | 8/1987  | Smoot et al. .................. 428/77 |
| 4,919,810 | A  |   | 4/1990  | Itoh et al. ............... 210/500.34 |
| 5,639,368 | A  |   | 6/1997  | Davis et al. .............. 210/321.8 |
| 5,876,690 | A  |   | 3/1999  | Mou et al. ................... 423/702 |
| 5,997,991 | A  | * | 12/1999 | Kato et al. ................... 428/182 |
| 6,004,444 | A  | * | 12/1999 | Aksay et al. ................. 204/515 |
| 6,027,666 | A  |   | 2/2000  | Ozin et al. ............ 252/301.4 R |
| 6,171,687 | B1 |   | 1/2001  | Leung et al. ............. 428/304.4 |
| 6,177,181 | B1 |   | 1/2001  | Hamada et al. .......... 428/304.4 |
| 6,319,427 | B1 |   | 11/2001 | Ozin et al. ............ 252/301.4 F |
| 6,464,853 | B1 | * | 10/2002 | Iwasaki et al. ............... 205/118 |

(Continued)

FOREIGN PATENT DOCUMENTS

WO   98/24724 A1   6/1998

OTHER PUBLICATIONS

Kozlov, et al. "Laser Action in Organic Semiconductor Waveguide and Double-Heterostructure Devices", *Nature*, vol. 389, 1997; pp. 362-364.

(Continued)

*Primary Examiner*—Alicia Chevalier
(74) *Attorney, Agent, or Firm*—Fitzpatrick, Cella, Harper & Scinto (57) ABSTRACT

A mesostructured material, which has plural tubular pores and is arranged on a polymer surface, characterized in that the pores are uniaxially oriented. The mesostructured material can be developed to functional devices.

15 Claims, 8 Drawing Sheets

U.S. PATENT DOCUMENTS 6,846,546 B2 * 1/2005 Kuroda et al. ............... 428/188
6,984,414 B2 1/2006 Miyata ....................... 427/243

OTHER PUBLICATIONS

Inagaki, et al. "Synthesis of Highly Ordered Mesoporous Materials from a Layered Polysilicate", *Journal of the Chemical Society: Chemical Communication*, 1993; pp. 680-682.

Banks, et al. "Birch Reduction of $C_{60}$—a New Appraisal", *Journal of the Chemical Society: Chemical Communication*, 1993; pp. 1149-1152.

Kresge, et al. "Ordered Mesoporous Molecular Sieves Synthesized by a Liquid-Crystal Template Mechanism", *Nature*, vol. 359, 1992; pp. 710-712.

Chen, et al. "A Tough SiAJON Ceramic Based on $\alpha$-$Si_3N_4$ With a Whisker-Like Microstructure", *Nature*, vol. 389, 1997; pp. 701-704.

Hong Yang et al., "Free-Standing Mesoporous Silica Films; Morphogenesis of Channel and Surface Patterns," 7(9) *J. Mater. Chem.* 1755-61 (1997).

* cited by examiner

RUBBING DIRECTION →

STRUCTURE WITH ORIENTED TUBULAR PORES

BACKGROUND OF THE INVENTION

This application is a division of application Ser. No. 09/478,884, filed Jan. 7, 2000, now U.S. Pat. No. 6,846,546 which is incorporated herein by reference.

FIELD OF THE INVENTION

The present invention relates to the application of inorganic oxide porous materials used for catalysts, adsorbents or the like, more specifically mesostructured materials having a controlled mesopore orientation and a preparation method thereof.

RELATED BACKGROUND ART

Porous materials are widely utilized for various purposes such as adsorption and separation. According to IUPAC, porous materials are classified into three classes based on the pore size, i.e., microporous, mesoporous and macroporous materials having the pore sizes of not more than 2 nm, 2 to 50 nm and not less than 50 nm, respectively. In the microporous materials, metal phosphates, zeolite, such as natural aluminosilicates and synthetic aluminosilicates and the like, are known. These materials are utilized for selective adsorption, a shape-specific catalytic reaction and a molecular size reactor by exploiting their pore size.

Since the maximum pore size of the reported microporous crystals is about 1.5 nm, the synthesis of solids having a larger pore size is an important issue for conducting adsorption and reaction with bulky compounds, which cannot be adsorbed into the micropores. Although silica gel, pillared clay or the like have been known as materials having such larger pores, the pore size distributes in a wide range and control of the pore size has been a problem.

In such a background, synthesis of the mesoporous silica having mesopores of the same size arranged in a honeycomb-like arrangement have been achieved almost simultaneously by two different methods. Namely, one mesoporous silica called MCM-41 was synthesized by hydrolyzing silicon alkoxide in the presence of surfactants (Nature, vol. 359, p. 710), and the other material called FSM-16 was synthesized by intercalating alkyl ammonium between layers of kanemite, a layered polysilicate (Journal of Chemical Society Chemical Communications, vol. 1993, p. 680). In both methods, it is considered that the surfactant assembly acts as a structure-directing agent of mesostructured silica. These substances are not only extremely useful as catalysts for bulky compounds, which cannot enter the zeolite pores, but are also applicable as functional materials such as optical and electrical materials.

When applying the mesoporous materials having such a regular porous structure to the field of functional materials other than catalysts, the technology for retaining these materials uniformly on a substrate is important.

There are several methods for preparing a mesoporous thin film on a substrate, such as a spin coating method as described in Chemical Communications vol. 1996, p. 1149; a dip coating method as described in Nature, vol. 389, p. 364; a method based on the heterogeneous nucleation and growth on a solid surface as described in Nature, vol. 379, p. 703 or the like.

SUMMARY OF THE INVENTION

Conventional methods for preparing a mesostructured thin film have the following problems. In the films of mesostructured material formed by spin-coating, the pore orientation is random. On the other hand, only a limited number of substrates, such as cleaved mica and graphite, can provide a mesostructured film with oriented mesopores by a method based on the heterogeneous nucleation and growth. Even on these substrates, minute areas of aligned mesopores are randomly present without overall control of the orientation of the mesopores on the substrate. Thus, the present inventors reached a conclusion that the technical development for controlling the orientation of the mesopores is essential to the application of the mesostructured materials for functional devices.

One object of the present invention is to provide a mesostructured material having an entirely new constitution, which enables the development thereof to functional devices.

Another object of the present invention is to provide a mesostructured silica material having an entirely new constitution, which enables the application thereof to functional devices.

Still another object of the present invention is to provide a method for preparing a mesostructured material having highly oriented tubular mesopores on a given substrate.

Still another object of the present invention is to provide a preparation method for a mesostructured silica material having highly oriented tubular mesopores on a given substrate.

Still another object of the present invention is to provide a method for controlling the orientation of mesopores in a mesostructured material.

According to one aspect of the present invention, there is provided a mesostructured material having tubular mesopores, the mesostructured material being arranged on a polymeric surface constituted of a polymeric compound, wherein the tubular mesopores are oriented in a first direction parallel to the surface.

According to one aspect of the present invention, there is provided a mesostructured silica arranged on a polymer material surface, in which chains of the polymer material are oriented in a first direction parallel to the polymer material surface, having tubular mesopores, wherein the tubular mesopores are oriented in a second direction nearly perpendicular to the first direction, and the oriented tubular mesopores are formed on the polymer material surface by locating silica outside of an oriented rod-like surfactant micelle structure, the orientation of which is determined by a parallel accommodation of molecules of the surfactant on the chains of the polymer material through chemical interactions.

According to one aspect of the present invention, there is provided a process for forming a mesostructured silica having tubular mesopores comprising the steps of:

(i) providing a polymer material surface in which chains of the polymer material are oriented in a first direction parallel to the polymer material surface; and (ii) forming a mesostructured silica having tubular mesopores on the polymeric surface, the mesopores being filled with a surfactant and oriented in a second direction nearly perpendicular to the first direction, by forming an oriented rod-like surfactant micelle structure outside of which silica is located on the polymer material surface, the orientation of the rod-like surfactant micelle structure being determined by a parallel accommodation of molecules of the surfactant on the chains of the polymer material through chemical interactions.

According to one aspect of the present invention, there is provided a mesostructured material having tubular mesopores, the mesostructured material being arranged on a polymeric surface, wherein the tubular mesopores are oriented towards a prescribed direction parallel to the surface, and the direction is determined by a direction of a rubbing treatment of the polymeric surface.

Such embodiments are expected to be a highly effective constituent in developing a functional device.

According to one aspect of the present invention, there is provided a process for controlling an orientation of tubular mesopores of a mesostructured material comprising the step of hydrolyzing an alkoxide while a polymeric surface, which has been rubbed, is in contact with a solution containing a surfactant and the alkoxide.

According to one aspect of the present invention, there is provided a process for controlling an orientation of tubular mesopores of a mesostructured material comprising a step of hydrolyzing an alkoxide while a polymeric surface constituted of a polymeric compound whose polymer chains have been oriented in a prescribed direction parallel to the polymeric surface is in contact with a solution containing a surfactant and the alkoxide.

According to these embodiments, the orientation of mesopores, which is considered to be extremely important for development of the mesostructured material to fimctional devices, can be readily controlled.

In the present invention, the mesostructured materials include not only those having hollow mesopores, but also those having mesopores filled with the surfactant assembly. Such mesostructured materials become porous by removing the surfactant from the mesopores to make them hollow.

DETAILED DESCRIPTION OF THE PREFERRED EMBODIMENTS

Mesostructured Material

First Embodiment (Arrangement of Mesostructured Material on Polymer Film with Rubbing Treatment)

Figure 1A:
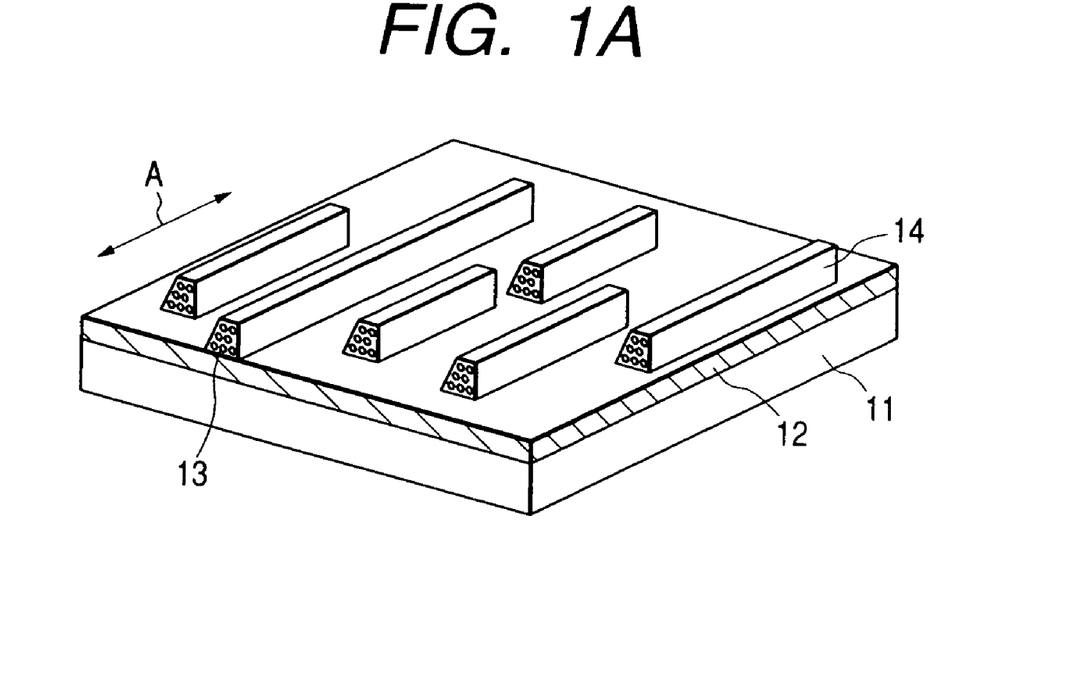
FIG. 1A is a schematic oblique view with a cross-section of one embodiment of the mesostructured silica material of the present invention.
Figure 1B:
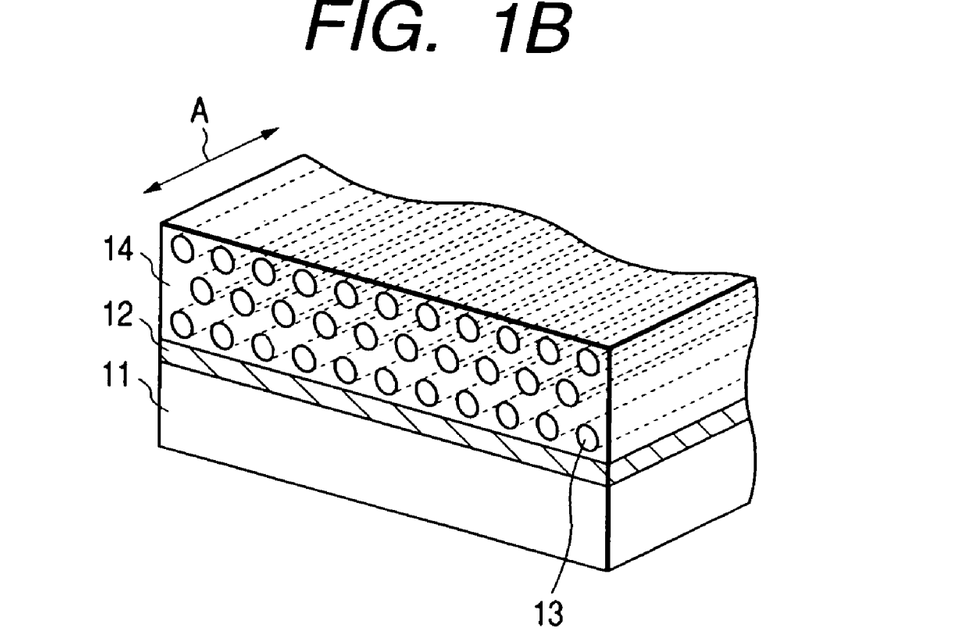
FIG. 1B is a schematic oblique view with a cross-section of another embodiment of a mesostructured silica material of the present invention.

Each of FIGS. 1A and 1B is a schematic oblique view of the mesostructured material of one embodiment of the present invention. In FIGS. 1A and 1B, reference numeral 11 is a substrate material, 12 is a polymer film and 14 is a mesostructured material arranged on the surface of the polymer film 12, and the mesostructured material 14 has tubular mesopores 13. Further, FIG. 1A shows a constitution where the surface of the film 12 has islands of mesostructured material 14 and the surfactant exists in the mesopores 13. FIG. 1B shows a constitution in which the mesostructural material 14 exists on the surface of the film 12 and the materials in mesopore 13 has been removed. The mesostructured material 14 has the tubular mesopores 13, which are oriented in a prescribed direction (direction of arrow A in FIGS. 1A and 1B) parallel to surface of the polymer film 12. The surface conditions of the film 12 contacting the mesostructured material 14 are very important for achieving such a constitution. The mesostructured material having mesopores 13 aligned in a certain orientation can be formed on the surface having an alignment-control ability, when an alkoxysilane is hydrolyzed while the surface is brought into contact with a solution containing an alkoxysilane and a surfactant.

Method for Controlling Surface Conditions of Polymer Film (1)

One method for controlling the surface conditions of the film 12 is a rubbing treatment. For example, the surface of the polymer film formed on a certain substrate material is rubbed in a certain direction with nylon cloth, velvet, or the like. When the alkoxysilane on the treated surface is hydrolyzed in the presence of a surfactant by a conventional method, for example under acidic conditions, a mesostructured material having many tubular mesopores is formed on the surface. The tubular mesopores are oriented in a direction of rubbing.

Rubbing Method and Conditions

The rubbing method and conditions therefor are not specifically defined. For example, methods and conditions used for the orientation of liquid crystal compounds can be appropriately applied. The following is an example of specified conditions. A rubbing cloth of nylon or velvet is wound around a roller 24 mm in diameter. The roller is pressed onto the polymer film surface to be treated to an extent that the roller passes about 0.4 mm into the film (hereinafter referred to as "press amount") and rotated at 1,000 rpm. At the same time, the stage on which the substrate with the polymer film is placed is moved at 600 mm/sec to rub the film surface. This treatment may be performed either once or repeatedly.

Polymer Film Material

Materials for the polymer film to be treated by rubbing are not especially limited. For example, materials used as the films for liquid crystal alignment in the liquid crystal field can be preferably used in this embodiment of the present invention. For example, there are polyethylene-$(CH_2CH_2)$—, nylon 66[—$NHC_6H_{12}NHCOC_4H_8CO$—], nylon 69 [—$NHC_6H_{12}NHCOC_7H_{14}CO$—], nylon 6 TPA—$NHC_6H_{12}NHCO$-$\phi$-CO—], polybutylene terephthalate[—$C_4H_8OCO$-$\phi$-COO—], polyethylene terephthalate

[—$C_2H_4OCO$-φ-$COO$—], polyimides (e.g., the following chemical formula (i)), polyesters and parylene polyparaxylene or the like.

(i)

Substrate Material

In this embodiment, the surface-treated polymer film has been described as being retained on the substrate material. However, the polymer film itself can be the substrate material in this embodiment. As described later, when calcination is used to remove the surfactant existing in the mesopores in the mesostructured material formed on the polymer surface, the polymer film is preferably provided on a substrate material resistant to calcination. Such a substrate material includes silica glass, silicon or the like. In addition, the thickness of the polymer film formed on such a substrate material is not especially restricted and may be about 1 to 100 nm.

Method for controlling Surface Conditions of Polymer Film (2)

Another method for controlling the surface conditions of the polymer film 12 is to prepare the polymer film by the Langmuir-Blodgett (LB) method.

LB film is a film formed by transferring a monomolecular film developed on an aqueous surface onto the substrate and a film of any number of layers can be obtained by repeating this process. LB film in the present embodiment includes, in addition to the above-mentioned LB film, LB films obtained by treating, for example, with heat, an LB film comprised of monomolecular layers formed on the substrate to modify the chemical structure keeping the accumulative structure.

Figure 2:
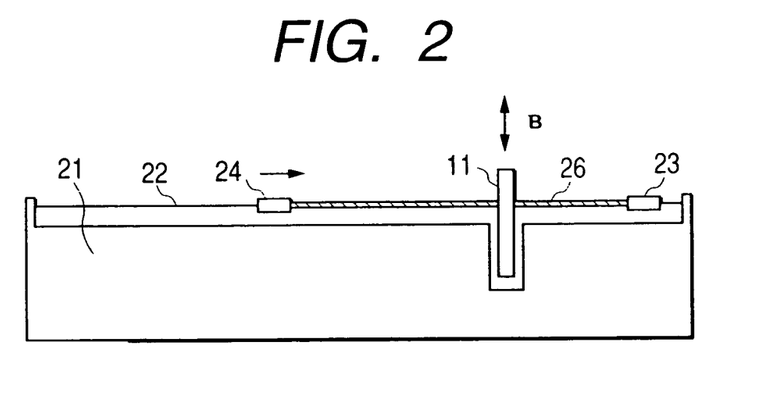
FIG. 2 is an explanatory diagram of an apparatus for LB film formation.

When forming an LB film on the substrate, conventional methods can be used. The film formation apparatus for LB films is illustrated in FIG. 2, where the reference numeral 21 shows a water tank filled with pure water 22 and the numeral 23 shows a fixed barrier to which a sensor of surface pressure (not shown) is attached. The monomolecular layer 26 on the water surface is formed by dropping the solution containing the object substance or precursor thereof onto the water surface in the area defined by a movable barrier 24 and fixed barrier 23. A surface pressure is added to the monolayer by moving the movable barrier 24. The position of movable barrier 24 is controlled by the surface pressure sensor so that a constant surface pressure is given during the film formation onto the substrate 11. Pure water 22 is constantly kept clean by a water supplying apparatus and a drainage apparatus (not shown). The water tank 21 has a cavity and the substrate 11 is held in this position. The substrate is moved up and down at a predetermined speed by a translation apparatus (not shown). The film on the aqueous surface is transferred onto the substrate when the substrate is placed into and removed from the water.

By using such an apparatus, the LB film on the substrate to be used in the present invention is obtained as follows: a surface pressure is applied to the monomolecular layer developed on the water surface: the substrate 11 is moved up and down in the arrow B direction in FIG. 2; each time when the substrate 11 enters or comes out from the water the monomolecular layer is transferred on the substrate 11. The morphology and properties of such a film are controlled by the surface pressure, the in/out moving speed of the substrate, and the number of the layers. The optimum surface pressure during film formation is determined based on the surface area-surface pressure curve, and generally is within the range of several mN/m to several tens mN/m. The moving speed of the substrate is generally set at several mm/min-several hundred mm/min. The above-described method is generally used for the LB film formation, but is not limited to it. For example, it is possible to use a method utilizing the flow of water, the sub-phase.

The material of the substrate on which the LB film is formed as mentioned above is not especially limited, but it is preferable to use a material that is stable under acidic conditions. For example, silica glass, ceramics, resin or the like are usable.

Various materials can be used as the material for the LB film in the present invention. It is preferable to use a polymer LB film, in order to carry out the thin film formation of the uniaxially oriented mesostructured silica material on the substrate in good conditions by deposition of the mesostructured silica material on the substrate. By using polymer materials, a thin film of the mesostructured silica material can be formed on various substrates. Use of a polyimide LB film enables formation of the mesostructured silica material film having a good uniaxial orientation.

The reason why mesopores in the mesostructured material formed on the LB film of polyimide become oriented is not known, but presumed as follows. When the LB film of the polyamic acid with the following chemical formula (ii) is formed on a substrate and calcinated at 300° C. for 30 min under a nitrogen gas atmosphere, the polyimide film of the chemical structure (i) is formed on the substrate.

Polyamic acid (ii)

The orientation of the polymer chain in the polyimide LB film formed on the substrate in such a manner can be confirmed by a Fourier Transfer Infrared Spectrophotometer (FT-IR). From polarized infrared spectra of the polyimide film formed on a silicon substrate, it was found that the polymer chains of the polyimide are oriented in a direction parallel to the withdrawal direction of the substrate during the LB film formation.

When the FT-IR spectrum is recorded using a polarized light parallel to the withdrawal direction, strong absorption is observed at near 1370 cm$^{-1}$ and 1520 cm$^{-1}$ assigned to the stretching vibration parallel to the molecular chain of the C—N bonds and the phenyl C—C bonds respectively. On the other hand, when the FT-IR spectrum is recorded by using a polarized light vertical to the withdrawal direction, strong absorption is observed at near 1725 cm$^{-1}$ assigned to the stretching vibration of C=O bonds vertical to the molecular chain.

Figure 3:
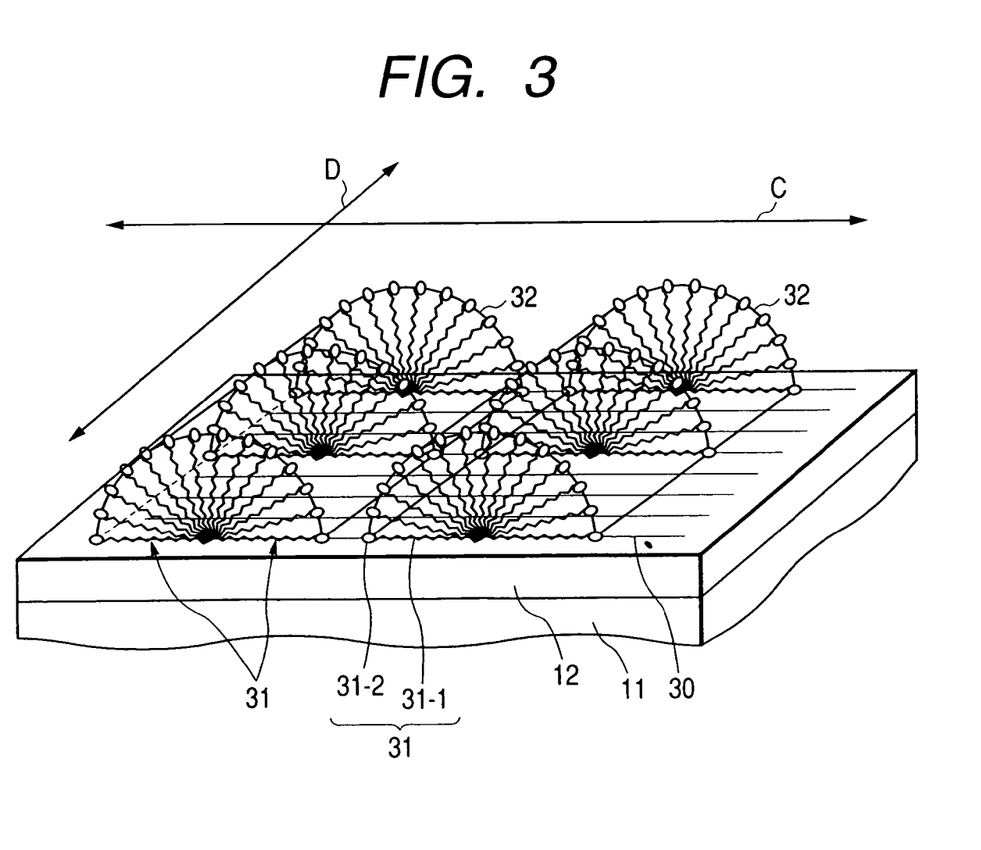
FIG. 3 is an explanatory diagram for a mechanism of mesostructured silica material formation in which mesopores are oriented on the LB film surface.

When a mesostructured material is formed by hydrolysis of alkoxysilane in the presence of a surfactant, as described later, on the polyimide film in which the polymer chains are aligned in one direction (arrow C direction in FIG. 3) parallel to the substrate surface, the amphiphilic surfactant molecules undergo chemical or physical interactions with the aligned surface polymer chains of the polyimide. Specifically, as illustrated in FIG. 3, the hydrophobic portion 31-1 of the surfactant 31 interacts chemically with each hydrophobic portion of the polymer chain 30 of the polyimide oriented on the substrate, leading to the parallel accommodation of the surfactant to the surface polymer chain. Consequently, the aligned surfactant molecules determine the direction of the rod-like micelle 32 on the surface. Silica (not shown) exists around this micelle structure. Such micelle structures 32 formed on the polymer film surface may determine the orientation of the successively formed rod-like micelle structure (not shown) by physical or chemical interaction. Consequently, the entire rod-like micelle structures are oriented in a direction (arrow D direction in FIG. 3) perpendicular to the orientation of the polymer chains of the polyimide. Thus, the mesostructured silica material with the uniaxial pore orientation is formed on the polyimide film surface. In this mesostructured silica, the mesopores contain the surfactant. This speculation is supported by the experimental fact that the mesopores in the mesostructured material formed on the substrate with the polyimide LB film are aligned along a direction perpendicular to the withdrawal direction of the substrate in the LB film formation, that is, the orientation of the polymer chains of the polyimide.

Preparation Apparatus

Figure 4:
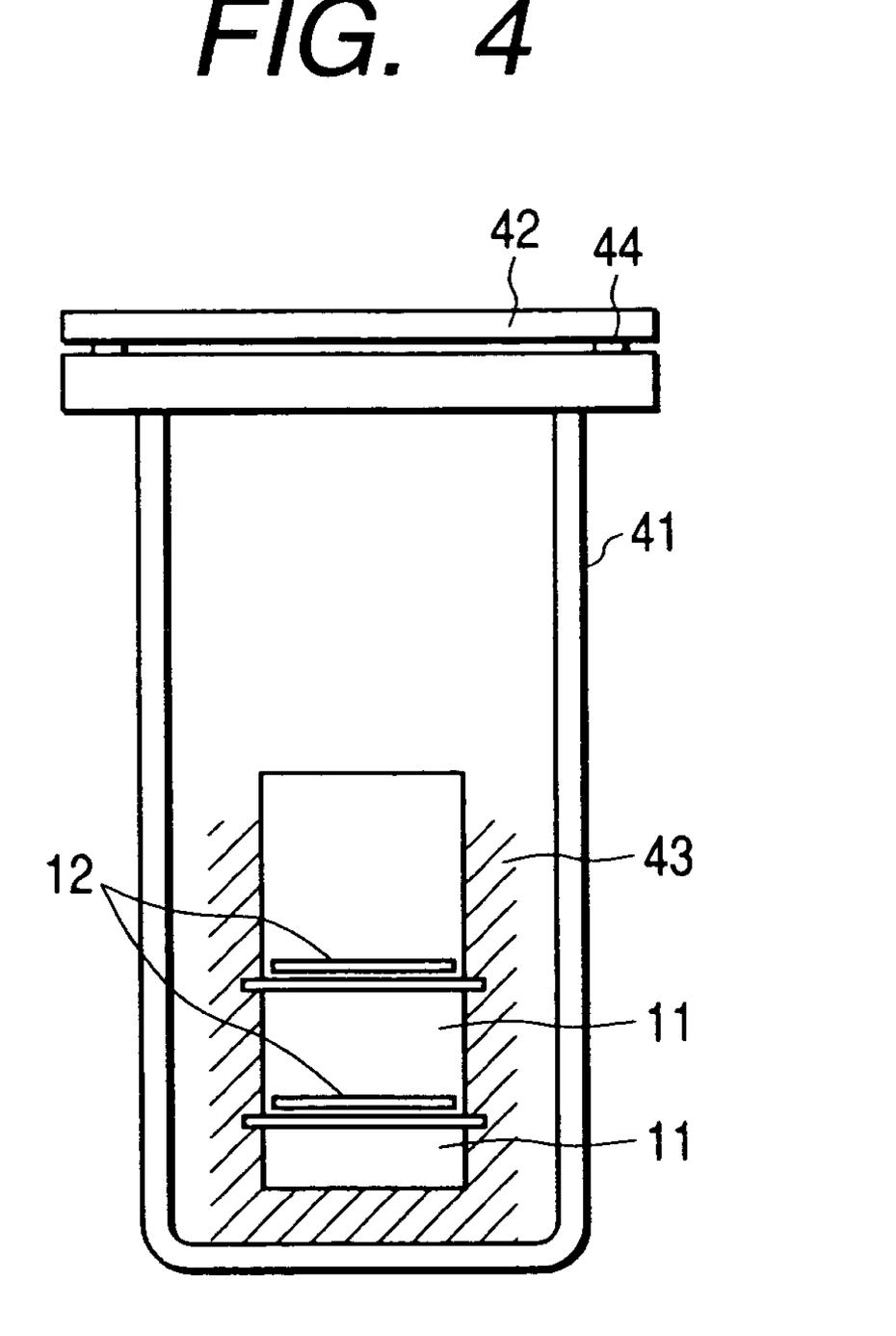
FIG. 4 is a schematic explanatory diagram of an apparatus for forming a mesostructured silica material of the present invention.

The reactor for forming the mesostructured material of the present invention is explained referring to FIG. 4. The material of the reactor 41 is not specifically defined so long as it is resistant to chemicals, specifically to acids, and polypropylene, polyfluoroethylene (commercial name: Teflon) or the like can be used. In the reactor 41, a substrate holder 43 made of an acid-resistant material is placed to hold the substrate having the above-mentioned rubbing-treated polymer film or LB film on the surface. In FIG. 4, the substrate 11 having a film 12 thereon is held in a horizontal position, but is not limited thereto. In FIG. 4, the reference numeral 42 denotes a lid made of an acid-resistant material and also 44 denotes a sealing material (O ring or the like) to increase air tightness between the lid and the reactor 41.

Figure 5A:
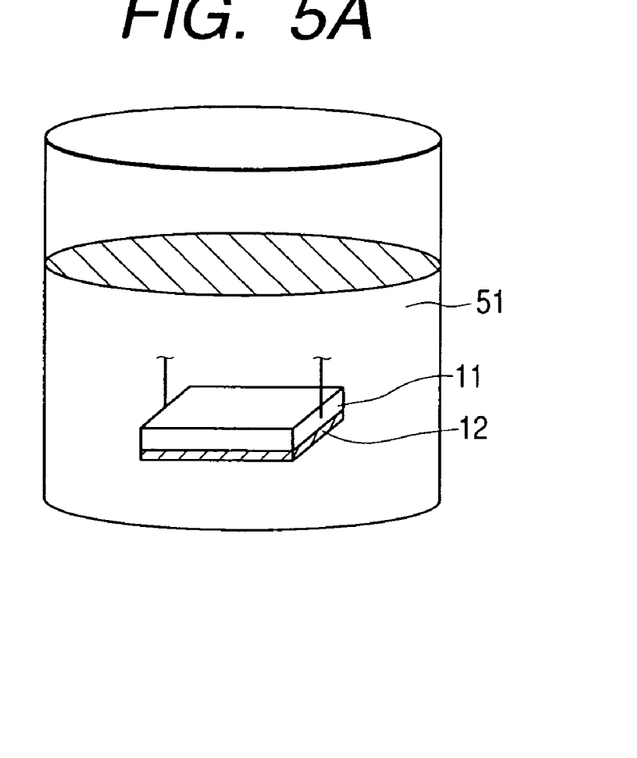
FIGS. 5A and 5B are explanatory diagrams of the holding method of a substrate in a reaction solution.
Figure 5B:
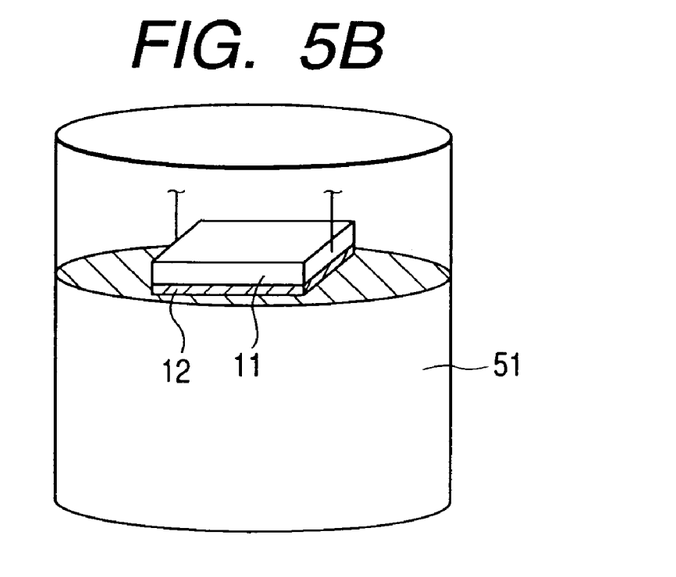

The substrate is generally held in a solution 51 containing a surfactant and alkoxysilane as shown in FIG. 5A. The mesostructured material of the present invention can be formed when the substrate is held as shown in FIG. 5B so long as the substrate surface holding the rubbing-treated polymer film or LB film is in contact with the reactant solution. Further, the reactor may be put into a sealed container made of a more rigid material, such as stainless steel, so that it is not destroyed even under pressure during the reaction.

In the present embodiment, a solution used for forming the mesostructured silica material is, for example, an aqueous mixture solution of an alkoxide of silicon (alkoxysilane) such as tetramethoxysilane and tetraethoxysilane and a surfactant of which pH is adjusted to lower than 2 (the isoelectric point of $SiO_2$) by mixing an acid such as hydrochloric acid.

Surfactant

The surfactant is appropriately selected from cationic surfactants such as quaternary alkylammonium salts, nonionic surfactants such as alkylamine and those containing polyethylene oxide as the hydrophilic group. The length of the surfactant molecule is determined according to the desired pore size of the object mesostructure. Further, an additive such as mesitylene may be added to enlarge a micelle size of the surfactant. As an example of a quaternary alkyl ammonium salt surfactant, the compound represented as the following chemical formula (iii) is preferably used:

(iii)

wherein $R_1$ to $R_3$ are independently methyl or ethyl, and $R_4$ is a $C_{10}$ to $C_{18}$ straight alkyl group, and X is a counter anion such as chlorine and bromine.

$SiO_2$ precipitates slowly under acidic conditions, especially near at the isoelectric point, unlike under basic conditions where it precipitates instantaneously after the addition of alkoxide.

The substrate must be treated for orientation prior to the use. The substrate material is not specifically limited, but those stable under acidic conditions are preferable, such as silica glass, ceramics, and resins.

The mesostructured silica can be deposited on the substrate under these conditions. The temperature of deposition is not specifically limited and is selected within the temperature range from room temperature to about 100° C. The reaction time is within the range from several hours to several months. The shorter the reaction time, the thinner the formed mesostructured silica material.

The mesostructured silica material formed on the substrate in such a way is dried in air after washing with pure water.

The mesopores in the mesostructured silica material thus obtained are filled with the surfactant, and the mesoporous structure having hollow mesopores can be obtained by removing the surfactant. The removal method can be selected from calcination, solvent extraction, liquid extraction under supercritical conditions or the like. For example, the surfactant can be thoroughly removed from the mesostructured material by calcining at 550° C. for 10 hr in air hardly destroying the mesostructure. Solvent extraction may be employed to remove the surfactant in the mesopores. Solvent extraction enables to use substrates, which would be deteriorated by calcination, although 100% removal of the surfactant is difficult.

Use of the oriented mesoporous silica of the present invention includes, for example, a functional material having metallic nanowires prepared by introducing metal atoms or organic metal molecules into the pore to have one-dimensional electric conductivity.

As described above, according to the embodiments of the present invention, the mesostructured material in which the mesopores are uniaxially oriented can be formed on an optional substrate. Further, according to the embodiments of the present invention, orientation of the mesopores in the mesostructured material can be controlled. Furthermore, by using these embodiments, development of the mesostructured material to the functional devices is expected.

The present invention is illustrated using Examples in more detail.

EXAMPLE 1

In this example, an oriented mesostructured material was prepared using a substrate subjected to a rubbing orientation treatment of the polymer thin film.

A silica glass substrate was washed with acetone, isopropyl alcohol and pure water, and the surface was cleaned in an ozone generator. Then, the NMP solution of polyamic acid A having the structure represented by the following chemical formula (iv) was spin-coated on the substrate, followed by a thermal treatment at 200° C. for one hour to convert to polyimide A represented by the following chemical formula (v).

Then, the substrate thus formed was treated by rubbing under the following conditions:

Rubbing conditions for polyimide A:
Cloth material: nylon
Roller size: 24 mm
Press amount: 0.4 mm
Rotation speed: 1,000 rpm
Stage movement: 600 mm/s
Repetition: twice.

An acidic solution of surfactant was prepared by dissolving 2.82 g of cetyltrimethylammonium chloride in 108 ml of pure water and adding 48.1 ml of 36% hydrochloric acid to it followed by stirring for 2 hr. Then, 1.78 ml of tetraethoxysilane (TEOS) was added to this solution, stirred for 2.5 min, and put into a Teflon container of the constitution shown in FIG. 4 having the substrates held in the substrate holders to soak the substrates in the solution. The molar ratio of the final solution was $H_2O$ 100:HCl 7: cetyltrimethylammonium chloride 0.11:TEOS 0.10. The container was covered with the lid and sealed by a sealing stainless container, and placed in an oven at 80° C. The reaction time was set to 2 hr and 2 weeks.

The substrate in contact with the reactant solution for a predetermined time was taken out from the container, washed well with pure water, and then dried in air at room temperature.

Figure 6:
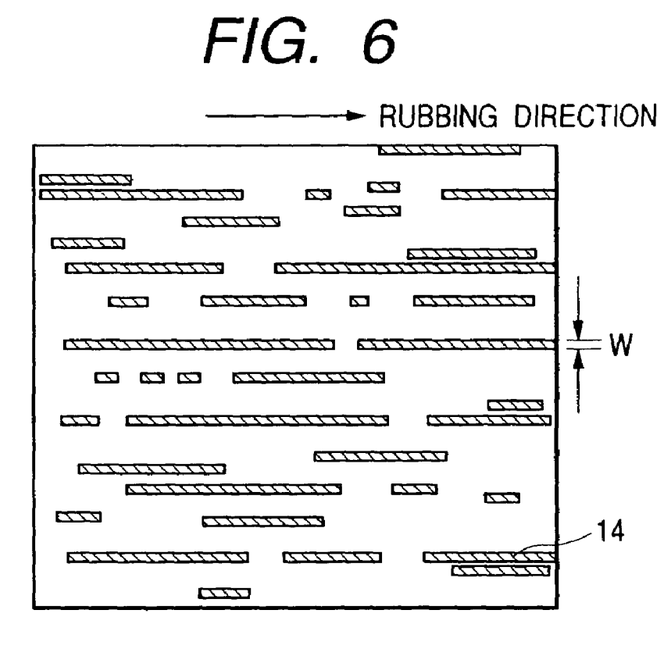
FIG. 6 is a schematic diagram of the microscopic image of a mesostructured silica material prepared with 2 hr reaction in Example 1.

The microscopic morphology of the substrate after a 2 hr reaction is schematically shown in FIG. 6 (plan view). As shown in this figure, on the substrate having the rubbing-treated polymer film, each particle appears to be elongated in the rubbing direction. Thus, the direction of the mesostructured silica particles was controlled by an alignment-controlling ability of the substrate. The width in the short axial direction of each particle represented as w in FIG. 6 was 1 to 2 µm.

Almost similar morphology of the mesostructured material was confirmed on the substrate contacted with the reactant solution for 2 weeks. Compared with the substrate of a 2 hr reaction, many mesostructured materials were observed and the height of each particle tended to be large.

The mesostructured silica formed on the substrate was analyzed by X-ray diffraction. As a result, a strong diffraction peak with a 3.68 nm d-spacing, assigned as (100) of the hexagonal structure, was observed, and it was confirmed that the mesostructured silica material has the hexagonal pore structure. Since no diffraction peak was observed in the wide angle region, it was found that silica composing the wall is amorphous.

The substrate with this mesostructured silica was placed in a muffle furnace and calcined in air at 550° C. for 10 hr. The heating rate was 1° C./min. No significant morphological differences were observed in the mesostructured silicas before and after the calcination. The X-ray diffraction analysis of the mesostructured silica material after calcination showed a strong diffraction peak with a 3.44 nm d-spacing. Thus it was confirmed that the hexagonal pore structure was retained after calcination. No diffraction peaks were observed in the wide angle region, confirming that the silica wall was still amorphous. Furthermore, the analysis by infrared spectroscopy confirmed that this sample after calcination contains no organic components derived from the surfactant.

Figure 9:
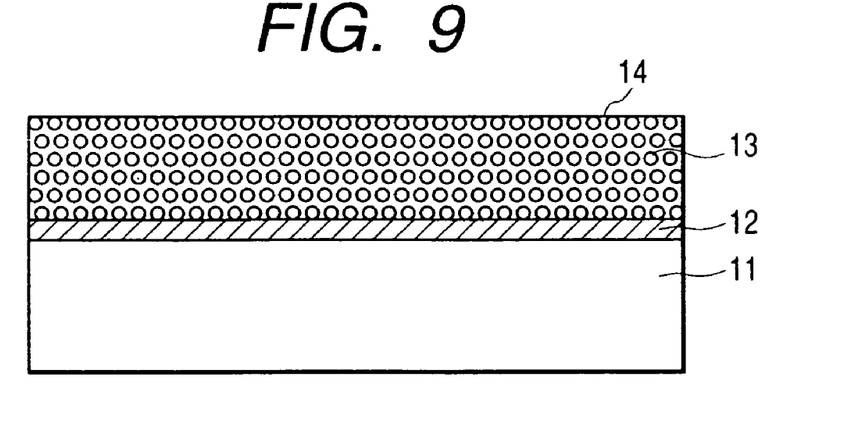
FIG. 9 is a schematic diagram of the TEM image of the mesostructured silica material obtained in Example 1.

The mesostructured silica before and after calcination was sliced perpendicular to the rubbing direction using a focused ion beam (FIB), and the cross-section was observed by transmission electron microscopy. In both cases, the pores of the hexagonal structure were observed in the cross-section to confirm that the mesopores were oriented in the rubbing direction. The schematic view of the cross-section is illustrated in FIG. 9.

Adhesion of the mesoporous silica particles to the substrate is highly improved by calcination and falling off did not occur even when rubbed with cloth after calcination. It is considered that the quartz substrate and the mesoporous silica layer are partially bonded by dehydrating condensation of silanols.

In this Example, mesostructured silica of a similar structure could be formed when the rubbing-treated surface was held in contact with the solution surface instead of being placed in the substrate in the solution.

COMPARATIVE EXAMPLE 1

By using clean silica glass substrates without the polyimide film and silica glass substrates having a polyimide A film without the rubbing treatment, the mesostructured silica material was formed on the substrates by the same procedure as in Example 1.

After a 2 week reaction period, the substrates were taken out from the reactor vessel and washed with pure water and dried in air.

Figure 7:
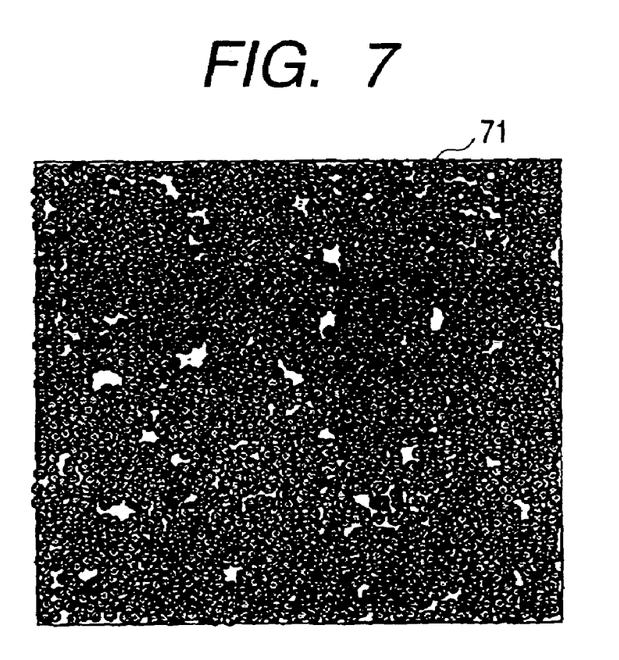
FIG. 7 is a schematic diagram of the microscopic image of the structure obtained in Comparative Example 1.

The microscopic morphology of the mesostructured material formed on the silica glass substrate without the polyimide film is schematically illustrated in FIG. 7. As shown in this figure, the substrate was fully covered with the disk-like particles 71 of about 1 um particle size.

The X-ray diffraction analysis of this film shows almost the same result as with the structure formed on the oriented polyimide film in Example 1. Thus, the mesostructure material was deposited but not orientated.

When the mesostructured material was formed on the polyimide film with no rubbing treatment, the morphology of the mesostructured material was the same as that observed with the silica glass substrate with no polyimide film, but with a smaller particle coverage. From this fact, it was confirmed that the orientation of the mesostructured material on the substrate as shown schematically in FIG. 6 achieved in Example 1 is contributed to the rubbing treatment.

EXAMPLE 2

This Example 2 is a preparation example of the mesoporous silica where the surfactant is removed by solvent extraction from the mesostructured silica formed on the substrate. By using the silica glass substrate on which polyimide A film was formed and rubbed as in Example 1, the mesostructured silica material was deposited on the substrate by using the same solvent composition and the same procedure as in Example 1.

When this mesostructured silica material is soaked in ethanol at 70° C. for 24 hr, more than 90% of the surfactant was removed from mesostructured silica material by one extraction. When the extraction was carried out twice, more than 95% of the surfactant was removed from the sample. After extraction, the thin film was dried to remove ethanol and the mesoporous silica was obtained.

This method of removing the surfactant micelles by solvent extraction used in Example 2 is an effective method for removing the surfactant from the mesostructured silica formed on the substrate, such as resin that is labile to the heat treatment under an oxidative atmosphere, although complete removal of the surfactant is difficult. This method has an advantage in that silanol groups are retained to a great extent in the prepared mesoporous silica, compared with the calcination treatment used in Example 1.

EXAMPLE 3

Example 3 is a preparation example of the mesoporous silica wherein the surfactant is removed by supercritical fluid extraction from the mesostructured silica material formed on the substrate.

By using the silica glass substrate on which polyimide A film was formed and rubbed as in Example 1, the mesostructured silica material was deposited on the substrate by using the same solvent composition and the same procedure as in Example 1.

Figure 8:
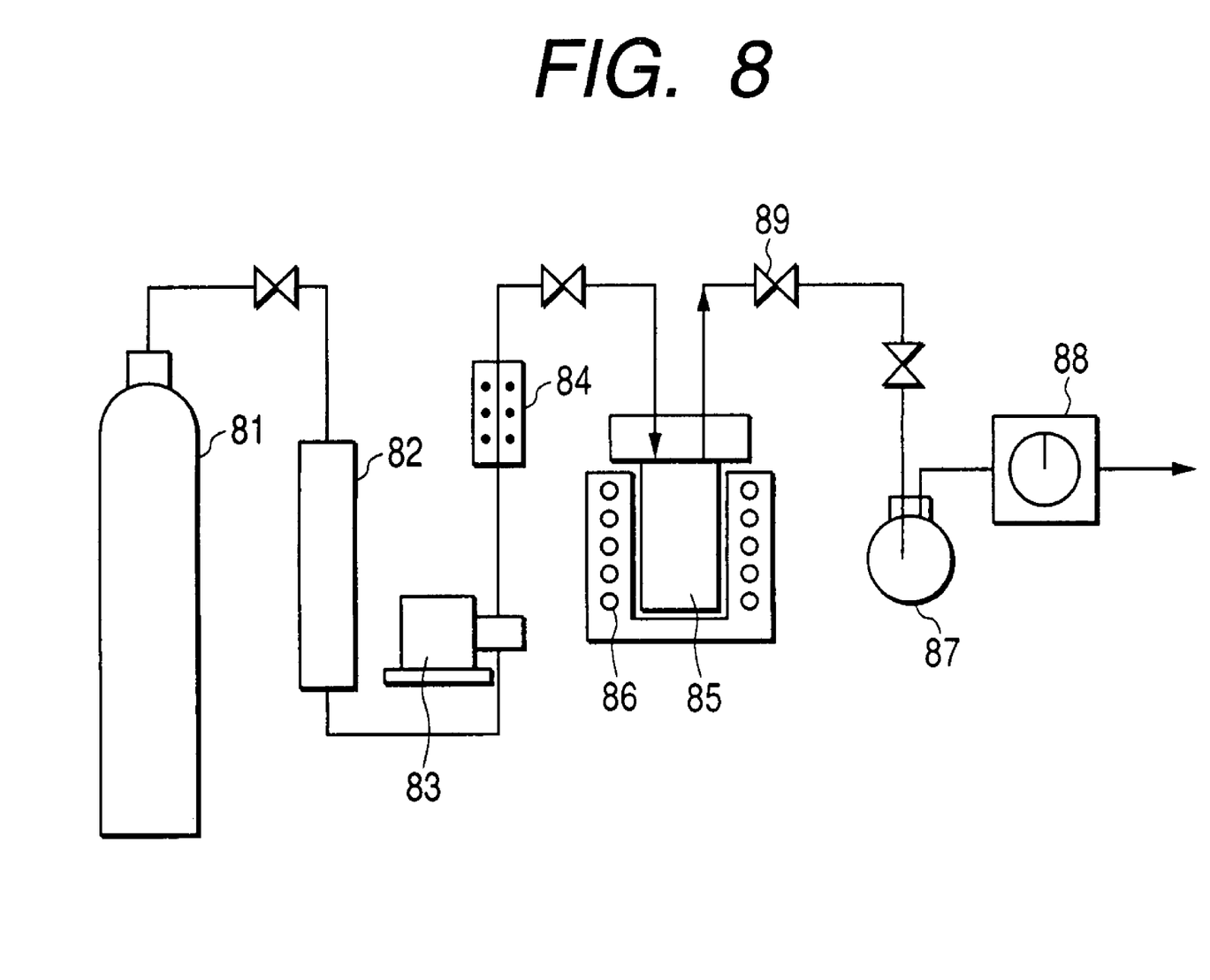
FIG. 8 is a schematic diagram illustrating the constitution of a supercritical drying apparatus, which can be used for removal of the surfactant existing within mesopores.

The liquid phase in this mesostructured material was fully replaced with ethanol by soaking it in ethanol. In this case, as described in Example 2, the surfactant permeates into ethanol. Thereafter, the mesostructured silica material was placed in a supercritical drying apparatus having a constitution as shown in FIG. 8. Then, extraction of the organic substances was performed using carbon dioxide as a fluid under supercritical conditions of 31° C. and 72.8 atm. The analysis by infrared spectroscopy confirmed that the organic substances did not remain in the mesoporous silica after drying under supercritical conditions, i.e., the surfactant was completely removed.

This method requires a more complicated apparatus than that described in Example 2, but enables a complete removal of the surfactant at a lower temperature.

Further, a mesoporous silica film can be obtained without damaging the mesostructure by drying with a supercritical fluid, since no stress is applied during the drying process. Furthermore, compared with the calcination method for removing the surfactant within the mesopores, this method has an advantage in that silanol groups are retained to a great extent in the prepared mesoporous silica.

FIG. 8 shows a $CO_2$ cylinder 81, a chiller 82, a pump 83, a preheater 84, an extractor 85, a heater 86, a separator 87, a gas meter 88 and a bulb 89.

EXAMPLE 4

Example 4 is an example where: the polyimide LB film is formed on the surface of the silica glass substrate; the mesostructured silica material is formed on the substrate; and then the mesopores are hollowed by removing the surfactant assembly from the mesostructured silica material by calcination. First, the polyimide LB film is formed on the surface of the silica glass substrate as follows. N,N-dimethylhexadecylamine salt of polyamic acid was prepared by mixing the polyamic acid represented by aforementioned chemical formula (iv) and N,N-dimethylhexadecylamine in a molar ration of 1:2. This was dissolved in N,N-dimethylacetoamide to make a 0.5 mM solution and this solution was dropped onto the water surface in an LB film forming apparatus kept at 20° C. The unimolecular film formed on the water surface was transferred onto the substrate at a dipping rate of 5.4 mm/min under a constant surface pressure of 30 mN/m. In this case, the used substrate was a silica glass substrate that had been washed with acetone, isopropyl alcohol and pure water followed by surface cleaning in an ozone generator and then subjected to the hydrophobic treatment. After forming 30 layers of the polyamic acid alkylamine salt LB film under the above conditions, the film was baked at 300° C. for 30 min under a nitrogen gas flow to convert into the polyimide LB film represented by the above chemical formula (v). Imidation by cyclodehydration of polyamic acid and elimination of an alkylamine were checked by infrared spectroscopy. Further, it was confirmed by FT-IR that the main chains of the polyimide were aligned in the same direction as the moving direction of the substrate during the LB film formation.

Next, on the silica glass substrate on which the polyimide LB film was thus provided, the mesostructured silica was formed as follows.

First, 2.82 g of cetyltrimethylammonium salt was dissolved in 108 ml of pure water. Then, 48.1 ml of 36% hydrochloric acid were added and stirred for 2 hr to prepare an acidic solution of the surfactant. Next, 1.78 ml of tetraethoxysilane (TEOS) were added to this solution and stirred. This solution was put into a Teflon reactor having the constitution represented in FIG. 4 in which the substrates were held in the substrate holders to soak the substrates in the reactant solution. In this process, the substrates were held with the surface having the LB film downward. The final molar ratio composition of the reactant solution used in the present Example was $H_2O$:HCl: cetyltrimethylammonium chloride: TEOS=100:7: 0.11:0.10. The reactor was closed with a lid, sealed by a sealing stainless container, and placed in an oven at 80° C. The reaction time was set to 2 hr and 2 weeks. The substrate in contact with the reactant solution for a predetermined time was taken out from the container, washed well with pure water, and dried in air at room temperature.

Figure 10:
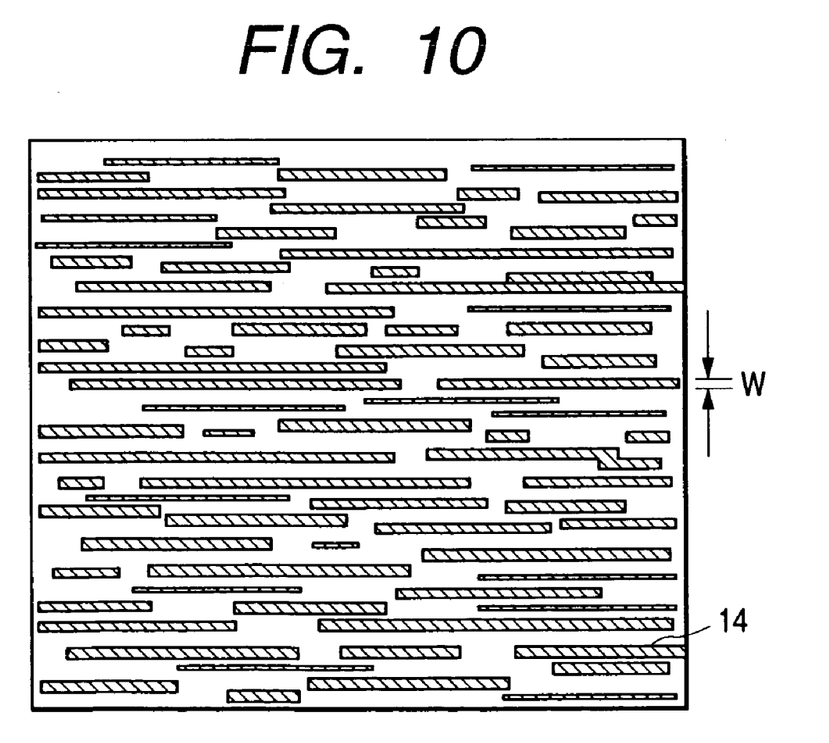
FIG. 10 is a schematic diagram of the microscopic image of the mesostructured silica material prepared by holding the substrate in the reactant solution for 2 hrs in Example 4.

The microscopic morphology of the substrate after a 2 hr reaction is schematically shown in FIG. 10. As shown in this figure, each particle is elongated along one axis. Thus, the growth direction of the particles was controlled by an alignment-controlling ability of the substrate. The width in the short axial direction of each particle represented by w in FIG. 10 was 1 to 2 pm.

Almost similar morphology of the mesostructured material was observed on the substrate contacted with the reactant solution for 2 weeks. Compared with the substrate of a 2 hr reaction, many mesostructured materials were observed and the height of each particle tended to be large. The mesostructured silica formed on the substrate was analyzed by X-ray diffraction. As a result, a strong diffraction peak with a 3.74 nm d-spacing, assigned as (100) of the hexagonal mesostructure, was observed, and it was confirmed that the mesostructured silica material has a hexagonal pore structure. Since no diffraction peak was observed in the wide angle region, it was found that silica composing the wall is amorphous.

Next, the substrate with this mesostructured silica material was placed in a muffle furnace and calcined in air at 550° C. for 10 hr. The heating rate was 1° C./min. No significant morphological differences were observed in the mesostructured silicas before and after the calcination. The X-ray diffraction analysis of the mesostructured silica material after calcination showed a strong diffraction peak with a 3.46 nm d-spacing. Thus it was confirmed that the hexagonal pore structure was retained after calcination. No diffraction peaks were observed in the wide angle region, confirming that the silica wall was still amorphous. Furthermore, analysis of the infrared absorption spectrum confirmed that this sample after calcination contains no organic components derived from the surfactant.

Figure 11:
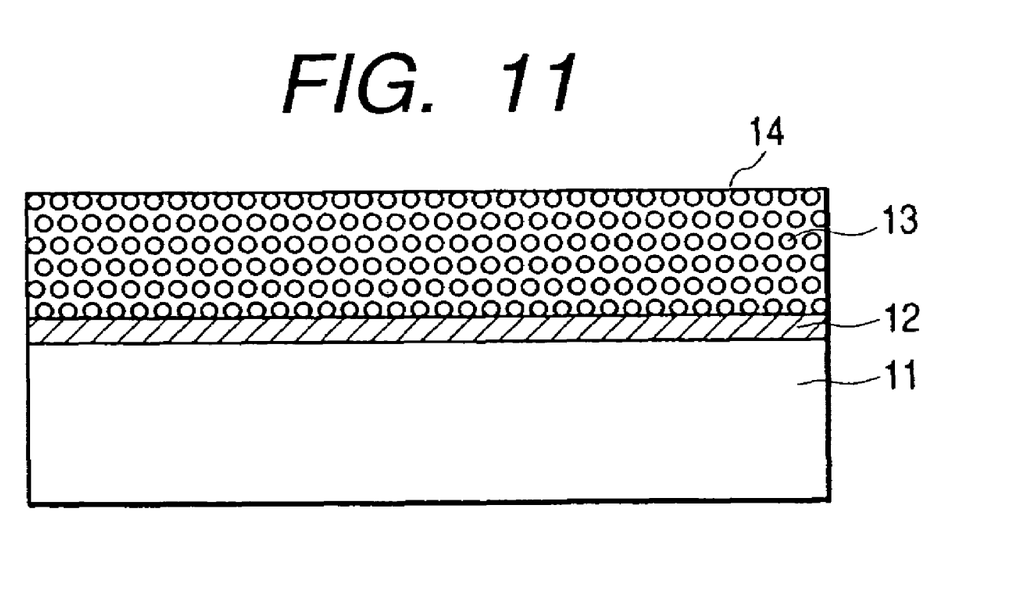
FIG. 11 is a schematic diagram of the TEM image of the mesostructured silica material obtained in Example 4.

The mesostructured silica materials before and after calcination were sliced parallel to the substrate moving direction during the LB film formation using a focused ion beam (FIB), and the cross section was observed by transmission electron microscopy (TEM). In both cases, the cross-section of the pores of the hexagonal structure was observed to confirm that the mesopores were aligned perpendicular to the moving direction. The schematic TEM view of the cross-section is illustrated in FIG. 11. Adhesion of the mesoporous silica particles to the substrate is highly improved by calcination and falling off did not occur even when rubbed with a cloth after calcination. It is considered that the quartz substrate and the mesoporous silica layer are partially bonded by a dehydrating condensation of silanols.

In this Example, mesostructured silica material of a similar structure could be formed when the surface having the LB film was held to touch the solution surface instead of holding the substrate in the solution.

EXAMPLE 5

The present Example is a preparation example of the mesoporous silica where the surfactant is removed by solvent extraction from the mesostructured silica formed on the substrate. First, according to the same procedure as Example 4, 30 layers of polyimide A LB film were provided on a silica glass substrate. Then the mesostructured silica film of a uniaxial pore orientation was formed on the substrate by using the same reactant solution and the same procedure as in Example 4. When this mesostructured silica is soaked in ethanol at 70° C. for 24 hr, more than 90% of the surfactant were removed from mesostructured silica by one extraction. When the extraction was carried out twice, more than 95% of the surfactant were removed from the sample. After extraction, the sample was dried to remove ethanol and the mesoporous silica was obtained.

This method of removing the surfactant micelles by solvent extraction used in Example 5 is an effective method for removing the surfactant from the mesostructured silica formed on the substrate such as resin that is labile to the heat treatment under an oxidative atmosphere, although complete removal of the surfactant is difficult. This method has an advantage in that silanol groups are retained to a great extent in the prepared mesoporous silica, compared with the calcination treatment used in Example 4.

EXAMPLE 6

The present Example is a preparation example of the mesoporous silica thin film where the surfactant is removed by critical fluid extraction from the mesostructured silica formed on a substrate.

First, according to the same procedure as Example 4, 30 layers of polyimide A LB film were provided on a silica glass substrate. Then, the mesostructured silica film with a uniaxial pore orientation was formed on the substrate by using the same reactant solution and the same procedure as in Example 4.

Then the liquid phase in this mesostructured material was fully replaced with ethanol by soaking it in ethanol. In this case, as described in Example 2, the surfactant permeates into ethanol. Thereafter, the mesostructured silica was placed in a supercritical drying apparatus having a constitution as shown in FIG. 8. Then, the extraction of the organic substances was performed using carbon dioxide as a fluid under supercritical conditions of 31° C. and 72.8 atm. The analysis by infrared spectroscopy confirmed that the organic substances did not remain in the mesoporous silica after drying under supercritical conditions, i.e., the surfactant was completely removed.

While this method requires a more complicated apparatus than that described in Example 5, it enables a complete removal of the surfactant at a lower temperature.

Further, mesoporous silica can be obtained without damaging the mesostructure by drying with supercritical fluid, since no stress is generated during the drying process. Furthermore, compared with the calcination method for removing the surfactant within the mesopores, this method has an advantage in that silanol groups are retained to a great extent in the prepared mesoporous silica.

What is claimed is:

1. A structure comprising:
   a first portion comprising a polymer; and
   a second portion formed on the first portion,
   wherein the second portion has tubular mesopores,
   wherein the tubular mesopores are aligned uniaxially throughout in the second portion formed on a surface of the first portion, which said surface faces the second portion,
   wherein a longitudinal axis of a tubular mesopores extends straight along the surface of the first portion.

2. The structure according to claim 1, wherein the polymer is aligned in a direction, which is different from an alignment direction of the tubular mesopores.

3. The structure according to claim 2, wherein the polymer alignment direction and the tubular mesopores alignment direction are substantially orthogonal to each other.

4. The structure according to claim 1, wherein the first portion contains at least one of polyethylene, nylon, polybutylene terephthalate, polyethylene terephthalate, polyester, polyimide and parylene polyparaxylilene.

5. The structure according to claim 1, further comprising a substrate on which the first portion is formed.

6. The structure according to claim 5, wherein the substrate is made of a glass.

7. The structure according to claim 5, wherein the tubular mesopores are parallel to the substrate.

8. The structure according to claim 7 wherein axes of the tubular mesopores are oriented in a direction parallel to a surface of the substrate.

9. The structure according to claim 1, wherein the first portion is comprised of a Langmuir-Blodgett film.

10. The structure according to claim 1, wherein the polymer is a polyimide.

11. The structure according to claim 1, wherein the mesopores are hollow.

12. The structure according to claim 1, wherein the first portion is constituted of a film of a polymer material, the film being arranged on a substrate, and the substrate is made of silicon oxide.

13. The structure according to claim 1, wherein the second portion has one end at one side and another end at another side and the tubular mesopores extend through from said one end to the other end.

14. A structure comprising:

a first portion comprising a polymer; and a second portion formed on the first portion, wherein the second portion has tubular mesopores, wherein the tubular mesopores are aligned uniaxially throughout in the second portion formed on a surface of the first portion, which said surface faces the second portion, wherein a longitudinal axis of a tubular mesopore extends straight along the surface of the first portion wherein a surfactant is held in the tubular mesopores.

15. The structure according to claim 14, wherein the surfactant is a cationic surfactant or a nonionic surfactant.

* * * * *

UNITED STATES PATENT AND TRADEMARK OFFICE
CERTIFICATE OF CORRECTION

PATENT NO. : 7,413,792 B2
APPLICATION NO. : 10/958245
DATED : August 19, 2008
INVENTOR(S) : Hirokatsu Miyata et al.

It is certified that error appears in the above-identified patent and that said Letters Patent is hereby corrected as shown below:

ON THE TITLE PAGE ITEM [56] REFERENCES CITED:

OTHER PUBLICATIONS, Chen, et al.: "Tough SiAJON" should read --Tough SiAlON--.

COLUMN 3:

Line 24, "fimctional" should read --functional--; and
Line 64, "Example 4;" should read --Example 4; and--.

COLUMN 4:

Line 19, "in mespore" should read --in the mesopores--.

COLUMN 5:

Line 28, "controlling" should read --Controlling--.

COLUMN 8:

Line 16, "and" should read --or--; and
Line 18, "near at" should be deleted.

COLUMN 9:

Line 61, "2 μ" should read --2 μ.--.

COLUMN 10:

Line 15, "3.44 mn" should read --3.44nm--; and
Line 54, "about 1 um" should read --about 1 μm--.

COLUMN 12:

Line 12, "ration" should read --ratio--.

UNITED STATES PATENT AND TRADEMARK OFFICE
CERTIFICATE OF CORRECTION

PATENT NO. : 7,413,792 B2
APPLICATION NO. : 10/958245
DATED : August 19, 2008
INVENTOR(S) : Hirokatsu Miyata et al.

It is certified that error appears in the above-identified patent and that said Letters Patent is hereby corrected as shown below:

COLUMN 13:

Line 53, "were" should read --was--; and
Line 55, "were" should read --was--.

COLUMN 14:

Line 40 claim 1, "portion," should read --portion, and--;
Line 41 claim 1, "mesopores" should read --mesopore--; and
Line 59 claim 8, "claim 7" should read --claim 7,--.

COLUMN 16:

Line 5 claim 14, "portion," should read --potion, and--.

Signed and Sealed this

Thirtieth Day of December, 2008

JON W. DUDAS
*Director of the United States Patent and Trademark Office*